No. 752,578. PATENTED FEB. 16, 1904.
J. S. McKENZIE.
POLE OR SHAFT FOR VEHICLES.
APPLICATION FILED JULY 20, 1903.
NO MODEL.
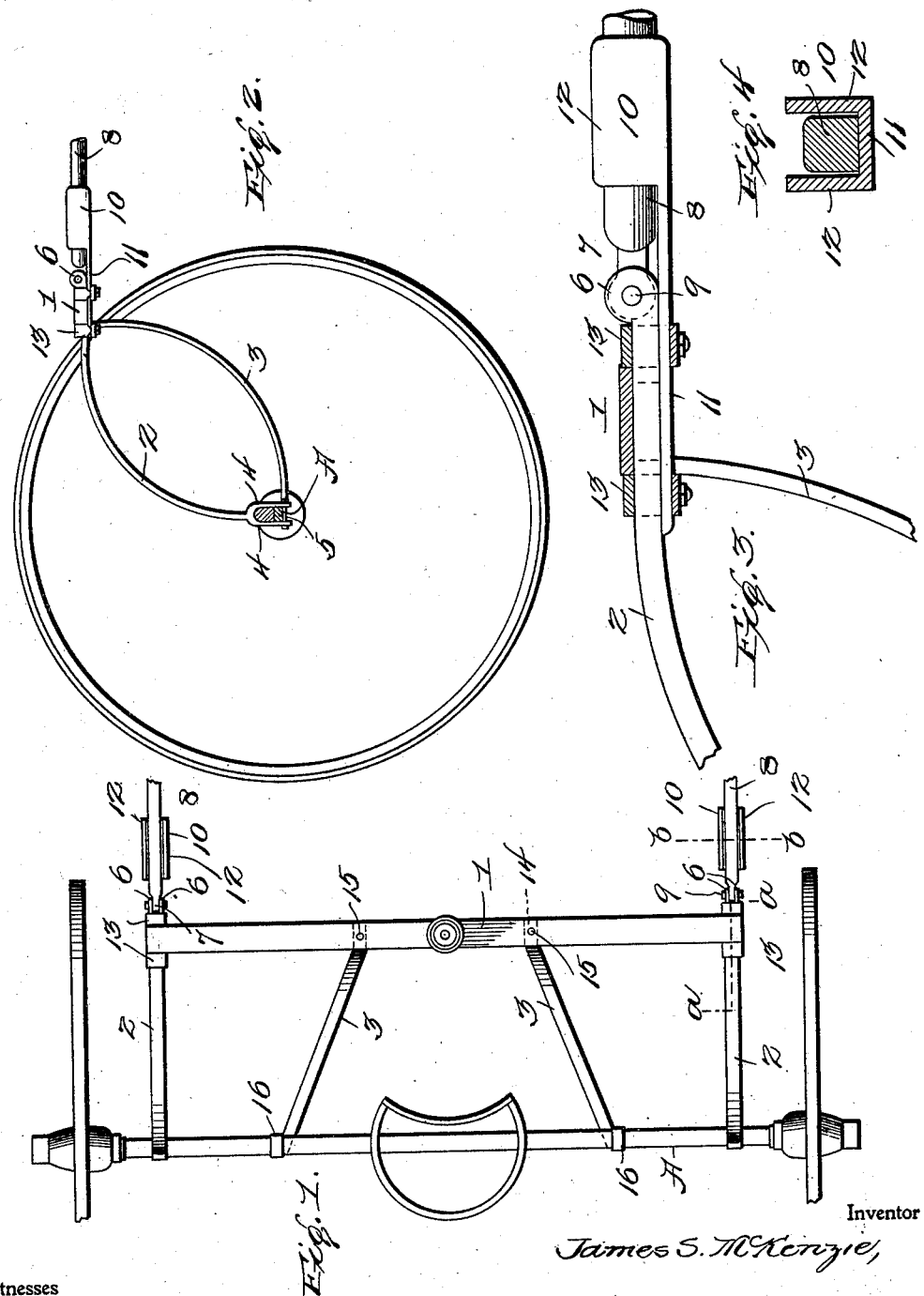

No. 752,578. Patented February 16, 1904.

UNITED STATES PATENT OFFICE.

JAMES SOLOMON McKENZIE, OF KLINE, SOUTH CAROLINA.

POLE OR SHAFT FOR VEHICLES.

SPECIFICATION forming part of Letters Patent No. 752,578, dated February 16, 1904.

Application filed July 20, 1903. Serial No. 166,363. (No model.)

*To all whom it may concern:*

Be it known that I, JAMES SOLOMON MCKENZIE, a citizen of the United States, residing at Kline, in the county of Barnwell and State of South Carolina, have invented certain new and useful Improvements in Poles or Shafts; and I do declare the following to be a full, clear, and exact description of the invention, such as will enable others skilled in the art to which it appertains to make and use the same.

My invention is an improved combined draft-frame and shaft or pole support for vehicles; and it consists in the construction and combination of devices hereinafter described and claimed.

The object of my invention is to provide an improved draft-frame for vehicles which is efficient for supporting the shafts or pole at a suitable height to relieve the horse or team entirely of the weight of the shafts or pole, which admits of vertical pivotal movement of the shafts or pole, and which also operates as an efficient coupling for the shafts or pole.

A further object of my invention is to provide an improved draft-frame which enables straight shafts to be used and obviates the necessity of forming the shafts with downwardly-curved inner ends, as is now the common practice, hence strengthening the shafts.

In the accompanying drawings, Figure 1 is a top plan view of a draft-frame embodying my improvements, showing the same attached to the front axle of a vehicle and showing the rear ends of a pair of shafts attached thereto. Fig. 2 is an elevation of the same, partly in section, through the axle-shaft. Fig. 3 is a detail sectional view of the same, taken on the plane indicated by the line *a a* of Fig. 1. Fig. 4 is a similar view taken on the plane indicated by the line *b b* of Fig. 1.

My improved draft-frame comprises a cross-bar 1, a pair of draw-bars 2, and a pair of brace-bars 3. The draw-bars 2 are curved upwardly and forwardly from the axle A and the brace-bars 3 are curved reversely with reference to the draw-bars 2 and extend forwardly and upwardly from the axle. The rear lower ends of the draw-bars 2 are bifurcated to form vertical arms 4, which are astride of the axle A and serve to connect the lower ends of the said draw-bars thereto. The arms 4 of each draw-bar are connected together by a bolt 5, which bears under the axle and serves to secure the draw-bar firmly thereto, as will be understood, and the said bolts and arms 4 of the draw-bars support the latter in the position shown in Fig. 2, so that the front upper ends of the draw-bars are permanently maintained at the desired height of the shafts or pole from the ground. The front ends of the draw-bars are formed with vertically-disposed pairs of shackle lugs or ears 6, appropriately spaced apart to receive the rear ends of the irons 7, which project from the rear ends of the shafts 8, the said shaft-irons being pivotally connected to and between the shackle lugs or ears by the bolts 9, as shown. Hence the shafts may be detachably and pivotally connected to the front ends of the draw-bars, as will be understood.

A pair of shaft-holders 10 are employed, each of which comprises a straight horizontal arm 11 and a pair of vertical upwardly-extending side plates or flanges 12 at the front end thereof, spaced apart a sufficient distance to receive one of the shafts 8 between them. The arms 11 have their rear portions bearing under the front straight portions of the draw-bars 2 and secured thereto by clips 13. Hence the shaft-holders, as well as the shafts, may be detached from the draw-bars 2 at will. The ends of the cross-bar 1 bear on the arms 11 of the shaft-holders between the clips 13, the front portions of the draw-bars extending through the said cross-bar. The latter is preferably angular in cross-section, as shown. The front ends of the brace-bars 2 are outturned and horizontally disposed, as at 14, bear under the cross-bar 1, and are secured thereto by bolts 15.

It will be observed by reference to the drawings that the shaft-holders 10 serve to support the shafts in a horizontal position at a suitable height from the ground when the horse is detached, so that the front ends of the shafts never become lowered to the ground. The pivotal connections between the rear ends of the shaft and the front ends of the draw-bars 2 enable the shafts to play vertically to accommodate them to the motions of the horse and also enable the shafts to be turned upwardly out of the way when the horse is detached therefrom. The draw-bars 2 and brace-bars 3 may be of any required length and shape to support the shafts at the desired height above the ground, according to the construction of the vehicle on which the draft-frame is employed. The rear ends of the brace-bars 3 are secured to the axle A by clip-bolts 16.

The shafts may be detached from the draft-frame and the rear ends of pole-irons attached to the shackles 6, as will be understood, when it is desired to employ a pole or tongue in connection with my improved draft-frame.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

It will be understood that my improved draft-frame is exceedingly simple, cheap, and effective, that much time and labor will be saved by its use, and that it enables shafts or a pole to be supported in a horizontal position at a suitable height above the ground to entirely relieve the horse or team of the weight thereof, and that it enables the shafts or pole when the vehicle is not in use to be either readily detached or turned to a vertical position out of the way.

Having thus fully described my invention, what I claim as new, and desire to secure by Letters Patent, is—

1. A draft-frame for vehicles, comprising draw-bars, having shaft-coupling devices at their front ends, and holders projecting in advance of the coupling devices to support the shafts in an elevated position.

2. A draft-frame for vehicles, comprising draw-bars having shaft-coupling devices at their front ends, a cross-bar connecting the draw-bars, holders projecting from the draw-bars in advance of the coupling devices, to support the shafts in an elevated position, and clips securing the holders to the under sides of the draw-bars and bearing against the front and rear sides of the cross-bar.

3. A draft-frame for vehicles comprising draw-bars, having means at their rear ends to attach them to a vehicle-axle, a cross-bar connecting the draw-bars, and brace-bars having means at their rear ends to attach them to an axle and having their front ends attached to the cross-bars at points between the ends thereof.

4. A draft-frame for vehicles, comprising forwardly and upwardly curved draw-bars, having means for attaching their rear ends to a vehicle-axle, a cross-bar connecting the front ends of the said draw-bars, brace-bars having their rear ends secured to the vehicle-axle, said brace-bars being curved reversely with respect to the draw-bars, and having their front ends also secured to the cross-bar, substantially as described.

In testimony whereof I have hereunto set my hand in presence of two subscribing witnesses.

JAMES SOLOMON McKENZIE.

Witnesses:
C. H. LANGLEY,
W. GILMAN SIMMS.